(12) United States Patent
Chen

(10) Patent No.: US 10,898,303 B2
(45) Date of Patent: Jan. 26, 2021

(54) THREE-IN-ONE TOOTH-CLEANING DEVICE STRUCTURED AS TOOTHPICK, INTERDENTAL BRUSH, AND FLOSS PICK

(71) Applicant: Yi-Chung Chen, Taipei (TW)

(72) Inventor: Yi-Chung Chen, Taipei (TW)

( * ) Notice: Subject to any disclaimer, the term of this patent is extended or adjusted under 35 U.S.C. 154(b) by 208 days.

(21) Appl. No.: 16/055,223

(22) Filed: Aug. 6, 2018

(65) Prior Publication Data

US 2019/0388201 A1 Dec. 26, 2019

(30) Foreign Application Priority Data

Jun. 20, 2018 (TW) .............................. 107121165 A

(51) Int. Cl.
| | | |
|---|---|---|
| *A61C 15/00* | (2006.01) | |
| *A61C 15/04* | (2006.01) | |
| *A46B 15/00* | (2006.01) | |
| *A61C 15/02* | (2006.01) | |

(52) U.S. Cl.
CPC ........ *A61C 15/046* (2013.01); *A46B 15/0071* (2013.01); *A61C 15/02* (2013.01); *A46B 2200/108* (2013.01)

(58) Field of Classification Search
CPC . A46B 15/0071; A46B 15/0073; A61C 15/02; A61C 15/04; A61C 15/046
USPC ........................... 132/312, 323, 329; D28/65
See application file for complete search history.

(56) References Cited

U.S. PATENT DOCUMENTS

| | | | | |
|---|---|---|---|---|
| 4,922,936 A | * | 5/1990 | Buzzi ..................... | A61C 15/02 132/321 |
| 6,158,444 A | * | 12/2000 | Weihrauch ............. | A61C 15/02 132/200 |
| D640,833 S | * | 6/2011 | Kang ............................. | D28/68 |
| D812,816 S | * | 3/2018 | Hanson .......................... | D28/66 |
| 2008/0149134 A1 | * | 6/2008 | Crossman .............. | A61C 15/02 132/324 |
| 2010/0326463 A1 | * | 12/2010 | Huang .................. | A61C 15/046 132/323 |
| 2012/0138083 A1 | * | 6/2012 | Tseng ................... | A61C 15/046 132/323 |
| 2012/0279517 A1 | * | 11/2012 | Kollar .................. | A61C 15/046 132/323 |

(Continued)

FOREIGN PATENT DOCUMENTS

GB          2222089 A  *  2/1990  .......... A61C 15/048

*Primary Examiner* — Nicholas D Lucchesi
(74) *Attorney, Agent, or Firm* — CIPO IP Group

(57) ABSTRACT

A three-in-one tooth-cleaning device structured as a toothpick, an interdental brush, and a floss pick includes a main body and an interdental elastic-bristle portion. The main body is integrally formed of a first plasticized material by injection molding and is structured as a floss pick at one end and as a toothpick at the opposite second end. The interdental elastic-bristle portion is integrally formed by injection molding a second plasticized material over the periphery of the main body in a section adjacent to the second end of the main body and forms a plurality of bristles. The second plasticized material has a lower hardness than the first plasticized material. The three-in-one tooth-cleaning device can be carried around to perform diversified, thorough, and effective removing operations on the dental plaque or food debris on and/or between teeth anytime and anywhere to prevent dental caries (especially interdental caries) and periodontal disease.

17 Claims, 6 Drawing Sheets

(56) References Cited

U.S. PATENT DOCUMENTS

| | | | |
|---|---|---|---|
| 2015/0020843 A1* | 1/2015 | Kim | A46B 15/0069 |
| | | | 132/309 |
| 2015/0257861 A1* | 9/2015 | Dishon | A46D 3/00 |
| | | | 132/329 |
| 2016/0193021 A1* | 7/2016 | Lin | A61C 15/041 |
| | | | 132/323 |
| 2016/0262531 A1* | 9/2016 | Hellkamp | A61C 15/02 |
| 2019/0274799 A2* | 9/2019 | Kato | A46B 3/005 |

* cited by examiner

THREE-IN-ONE TOOTH-CLEANING DEVICE STRUCTURED AS TOOTHPICK, INTERDENTAL BRUSH, AND FLOSS PICK

FIELD OF THE INVENTION

The present invention relates to a tooth-cleaning tool and more particularly to a three-in-one tooth-cleaning device having the structures of a toothpick, of an interdental brush, and of a floss pick so that one who carries the tooth-cleaning device with them can perform diversified, thorough, and effective removing operations on the dental plaque or food debris on and/or between teeth using the toothpick, interdental-brush, or floss portion of the device according to personal needs, preferences, or habits whenever and wherever desired, and rest assured that the foregoing toothcleaning operations will not damage the tooth surface, gums, or interdental papillae but are effective in preventing such oral diseases as interdental caries, periodontal disease, and gingivitis (e.g., swollen or bleeding gums), thereby contributing greatly to the prevention of caries (particularly interdental caries) and periodontal disease and consequently of coronary artery diseases or other cardio- or cerebrovascular diseases (e.g., heart attack, thrombosis, various strokes, senile dementia, and amnesia) attributable to such oral diseases.

BACKGROUND OF THE INVENTION

The last two to three decades saw substantial economic development worldwide. The majority of city dwellers, therefore, are now better off than before, leaving poverty and deprivation behind and leading an abundant, convenient, and comfortable modern life. In particular, people nowadays pay more and more attention to not only the enjoyment of food and drink, but also personal oral health. To prevent the food debris left on and/or between teeth after each meal from fermenting or decaying in the oral cavity and thus encouraging bacterial growth that may lead to bad breath, dental plaque on the tooth surface, or dental cavities, it is common practice to clean the tooth surface and interdental gaps with a tooth-cleaning tool such as a toothpick, an interdental brush, or a floss pick, depending on personal needs, preferences, or habits. And to satisfy this vast and pressing demand, the market is supplied with a variety of tooth-cleaning tools that differ in material and shape, the suppliers' goal being to grab consumers' attention and generate more profit by providing a wide range of choices with which consumers can effectively remove the food debris or plaque on and/or between teeth to ensure the cleanliness and hygiene of the oral cavity.

Take the conventional floss pick 10 in FIG. 1 for example. The conventional floss pick 10 includes a floss holding portion 101 and a handle 102. The floss holding portion 101 is U-shaped and has two corresponding ends fixedly connected to the two ends of a length of dental floss 103 respectively. The handle 102 is fixedly connected to the floss holding portion 101 and is designed to be gripped. After each meal, a user can grip the handle 102 of the conventional floss pick 10 with two fingers (e.g., a thumb and the corresponding index finger), place the floss holding portion 101 into the oral cavity, and then scrape off the plaque or food debris on and/or between teeth with the floss 103 on the floss holding portion 101.

With continued reference to FIG. 1, the floss 103 on the conventional floss pick 10 is indeed capable of scraping off the food debris or plaque on and/or between teeth, but even with the floss 103 on the conventional floss pick 10 being tautly stretched into a straight line segment, a user must still apply a force to the floss holding portion 101 in order to press the floss 103 into an interdental gap. Only then can the user move the conventional floss pick 10 back and forth to remove the food debris or plaque in the gap with the floss 103. If the gap is too small for the floss 103 to enter easily, or if the floss holding portion 101 has deformed such that the floss 103 is no longer taut (i.e., no longer a straight line segment), it will be difficult to remove the food debris or plaque on and/or between the adjacent teeth in areas close to the gum using the conventional floss pick 10. Most users, therefore, tend to force the floss 103 into an interdental gap so heavily that the floss holding portion 101 is twisted or otherwise deformed, causing friction or collision between the taut and tough floss 103 (or the rigid floss holding portion 101) and the users' gum or interdental papilla. Should that happen, the affected gum or interdental papilla may bleed, and bacterial infection may follow.

In light of the above, a conventional interdental brush 11 as shown in FIG. 2 was designed and is now available on the market. The conventional interdental brush 11 is composed of a support portion 110 and an elastic bristle portion 113. The support portion 110 is made of a first plasticized material and forms a handle 111 adjacent to one end, wherein the handle 111 is flat to facilitate gripping with two fingers (e.g., a thumb and the corresponding index finger). The opposite end of the support portion 110 extends linearly away from the handle 111 and forms a bristle supporting portion 112, which is in the shape of a slender rod.

With continued reference to FIG. 2, the elastic bristle portion 113 of the conventional interdental brush 11 is made of a second plasticized material and coats a portion of the bristle supporting portion 112 that is adjacent to the free end 112f of the bristle supporting portion 112, forming a plurality of bristles 1130 that extend vertically from the surface of that portion. As the first plasticized material is far harder than the second plasticized material, the support portion 110 of the conventional interdental brush 11 not only has sufficient structural strength to be gripped, and bear the force applied, by a user, but also can support the elastic bristle portion 113 and the bristles 1130 thereon, allowing the conventional interdental brush 11 to have adequate softness as well as the required structural strength. Once the elastic bristle portion 113 and the bristles 1130 thereon are passed through an interdental gap, the food debris or plaque in the gap can be easily brushed off with the bristles 1130 by moving the conventional interdental brush 11 back and forth. Generally, an interdental gap is larger toward the gum, so if an interdental gap is too small to be cleaned with a floss, the conventional interdental brush 11 can be used instead by gripping the handle 111 of the conventional interdental brush 11, placing the free end 112f of the conventional interdental brush 11 into the oral cavity, aligning the free end 112f with a portion of the gap that is adjacent to the gum, and then passing the free end 112f through that portion of the gap. By doing so, the food debris or plaque in the gap can be easily brushed off and taken out of the gap with the elastic bristle portion 113 and the bristles 1130 thereon. The soft elastic bristle portion 113 and the bristles 1130 thereon can also be used to massage, in a reciprocating manner, the gum area corresponding to the gap. Thus, not only can the food debris or plaque in the portion of the gap that is adjacent to the gum be completely removed while the gum is effectively protected from injury and bleeding, but also the gum can be massaged back and forth to promote blood circulation therein, with a view to maintaining both dental and gingival health.

The conventional floss pick 10 and the conventional interdental brush 11 have their respective advocators due to their different features and functions but, from the point of view of the vast meat-eating or vegetarian community, still lack a mechanism for easily removing of the meat or vegetable fibers lodged in an interdental gap. The aforesaid communities, therefore, are inclined to use the conventional bamboo toothpicks, whose pointed tip can easily penetrate an interdental gap and whose tough material enables effective removal of the meat or vegetable fibers stuck between teeth. However, one who is using a bamboo toothpick tends to press the portion of the toothpick that is adjacent to the tip forcibly into the interdental papilla area without knowing it, thus creating a gap that is not present in the papilla area in the first place. This gap will enlarge with persistent use of toothpicks and consequently expand the original interdental gap. Moreover, the pointed tip and tough material of a bamboo toothpick may damage the enamel on the tooth surface, the interdental papillae, or the soft tissues of the gums (e.g., by puncture) due to improper force application during the tooth picking process, resulting in bleeding gums, if not local bacterial infection. This is the main reason why most dentists strongly advise against the use of bamboo toothpicks and urge their patients to operate toothpicks of whatever material gently, holding that toothpicks are suitable for use only by those who suffer from atrophy of interdental papillae and have expanded interdental gaps.

To cater for the market demand for toothpicks, which as stated above are preferred and needed by specific communities, a toothpick brush 1 with a special structure as shown in FIG. 3 and FIG. 4 was developed. The toothpick brush 1 is integrally formed of a rigid, fiber-containing, plasticized material and includes a handle section 12, a cleaning section 13, a bristle section 15, and a toothpick section 17. The handle section 12 has two opposite sides each concavely provided with a gripping groove 121. When a user grips the handle section 12 with two fingers (e.g., a thumb and the corresponding index finger), the skin of the fingers will be partially caught in the gripping grooves 121 to increase friction between the toothpick brush 1 and the fingers gripping it, allowing the user to hold the handle section 12 firmly and apply a steady force precisely to the toothpick brush 1 while cleaning teeth with the toothpick brush 1. Thus, inconveniences that may otherwise result from the fingers slipping off the handle section 12 are avoided, and the user's interdental papillae and gums are protected from injury or bleeding that may otherwise arise from improper force application should the fingers slip off the toothpick brush 1.

With continued reference to FIG. 3 and FIG. 4, the cleaning section 13 of the toothpick brush 1 has one end connected to the corresponding end of the handle section 12. Moreover, the cleaning section 13 is gradually reduced in width from the aforesaid end toward the opposite end, thus forming a tapered body, allowing the narrower end of the cleaning section 13 to extend easily into an interdental gap to push out the food debris or plaque in the gap. In addition, each of two opposite sides of the cleaning section 13 is provided with a plurality of first scraping units 131. By inserting the cleaning section 13 into an interdental gap and moving the cleaning section 13 back and forth, the food debris or plaque on the adjacent teeth in areas close to the gap can be scraped off by the first scraping units 131 to clean the teeth effectively. As shown in FIG. 3 and FIG. 4, the first scraping units 131 on the toothpick brush 1 can be designed as recesses or other structures (e.g., projecting blocks or wavy lines) to meet production requirements or market demands.

With continued reference to FIG. 3 and FIG. 4, the bristle section 15 includes a rod 151 and a plurality of bristles 153. The rod 151 has one end connected to the corresponding end of the cleaning section 13 and is gradually reduced in diameter from the aforesaid end toward the opposite end, wherein the smallest diameter of the rod 151 preferably ranges from 0.35 mm to 0.45 mm and the largest diameter of the rod 151 preferably ranges from 0.55 mm to 0.65 mm. When the bristle section 15 is used to clean teeth, the thinner end of the rod 151 can be easily inserted into an interdental gap, and once the narrower end of the cleaning section 13 is also inserted into the gap, the first scraping units 131 can be used to clean the adjacent teeth effectively.

As shown in FIG. 3 and FIG. 4, the bristles 153 are arranged along two opposite sides of the rod 151 and are gradually reduced in length from a middle portion of the rod 151 toward the two ends of the rod 151. The plural rows of bristles 153 of different lengths are intended to bring food debris or plaque out of interdental gaps. Preferably, the bristles 153 on each side are arranged at an interval of 0.4 mm to 0.6 mm, the longest bristles 153A have a length ranging from 1.4 mm to 1.8 mm, and the shortest bristles 153B have a length ranging from 0.5 mm to 0.7 mm Besides, there are preferably 8 to 10 bristles 153 on each side.

As shown in FIG. 3 and FIG. 4, the toothpick section 17 has one end connected to the corresponding end of the handle section 12 and is gradually reduced in width from the aforesaid end toward the opposite end to resemble a blade in shape (see FIG. 3). Each of two opposite sides of the toothpick section 17 is provided with a plurality of second scraping units 171 so that, once the toothpick section 17 is inserted into an interdental gap, the second scraping units 171 can be used to scrape off the food debris or plaque on the adjacent teeth in areas close to the gap to clean the teeth and the gap effectively. The second scraping units 171 on the toothpick brush 1 can also be designed as recesses or other structures (e.g., projecting blocks or wavy lines) to meet production requirements or market demands Preferably, the thinnest part of the toothpick section 17 has a thickness ranging from 0.3 mm to 0.4 mm, and the thickest part, from 0.55 mm to 0.65 mm so that the thinner end of the toothpick section 17 can be easily inserted into an interdental gap and, thanks to the gradual change in thickness, the second scraping units 171 can lie against the adjacent teeth to remove the plaque on the teeth effectively. The toothpick section 17 is in the form of a blade and therefore has a relatively large area in order to be used to scrape off any tongue coating in addition to cleaning interdental gaps.

In theory, the toothpick brush 1, which has such structural features as the cleaning section 13, the bristle section 15, and the toothpick section 17, should be able to function as a conventional interdental brush as well as a conventional toothpick and have more practical value than counterparts of its individual sections because it allows its user to clean their teeth and interdental gaps with the cleaning section 13, the bristle section 15, and/or the toothpick section 17 as appropriate, and to scrape off the food debris or plaque on their teeth in areas adjacent to the interdental gaps with the scraping units 131 and 171. In practice, however, the toothpick brush 1 is integrally formed of a rigid, fiber-containing, plasticized material and hence does not differ much in function or effect from the conventional bamboo toothpicks. During use, for example, the toothpick brush 1 is still very likely to create gaps that are not present in the interdental papilla areas in the first place, and long-term use of the toothpick brush 1 will inevitably enlarge such gaps and consequently the original interdental gaps. The pointed end and/or tough material of the cleaning section 13, of the bristle section 15, or of the toothpick section 17 may also damage a user's interdental papillae or puncture the soft tissues of the gums due to improper force application during the tooth picking process, causing hemorrhage, if not local bacterial infection, of the gums or interdental papillae. Besides, when either the toothpick brush 1, the conventional floss pick 10, or the conventional interdental brush 11 is used to clean the teeth at the back of the oral cavity (e.g., the molar teeth), the user must keep their mouth wide open and press the toothpick brush 1, the conventional floss pick 10, or the conventional interdental brush 11 forcibly into a corner of the mouth; otherwise, the bristle section 15, the floss 103 on the conventional floss pick 10, or the bristles 1130 on the conventional interdental brush 11 simply cannot be inserted into the gaps between such teeth. The foregoing actions, however, are extremely inconvenient and unsightly. It is therefore an important issue in the related industries, which is also the issue to be addressed by the present invention, to make comprehensive improvements to the toothpick brush 1, the conventional floss pick 10, and the conventional interdental brush 11 so that the resulting product can be used not only in a convenient and visually decent manner, but also selectively as a toothpick, an interdental brush, or a floss pick while ensuring effective protection for the user's tooth surface, interdental papillae, and gums.

BRIEF SUMMARY OF THE INVENTION

In view of the foregoing problems and drawbacks of the toothpick brush 1, of the conventional floss pick 10, and of the conventional interdental brush 11, the inventor of the present invention, a former leader in public affairs associated with dentistry, incorporated years of clinical and teaching experiences in dentistry and related services into extensive research and experiment and finally succeeded in developing a three-in-one tooth-cleaning device structured as a toothpick, an interdental brush, and a floss pick. The invention is intended to provide its users with a diversified choice of tooth-cleaning aids (including a toothpick, an interdental brush, and a floss pick) as well as effective protection for the users' tooth surface, interdental papillae, and gums.

One objective of the present invention is to provide a three-in-one tooth-cleaning device structured as a toothpick, an interdental brush, and a floss pick. The three-in-one tooth-cleaning device includes a main body and an interdental elastic-bristle portion. The main body is integrally formed of a first plasticized material by injection molding and includes a gripping portion, a floss holding portion, an interdental-brush portion, and a toothpick portion. The gripping portion has a flat (or cylindrical or otherwise in terms of cross-sectional shape) and straight-line configuration and is designed to be gripped with two fingers (e.g., a thumb and the corresponding index finger). The floss holding portion is U-shaped, is fixedly connected to one end of the gripping portion, and has two corresponding supporting arms. The centerlines of the supporting arms and the centerline of the gripping portion form a first angle and a second angle respectively. A length of dental floss is fixed at each of its two ends to one of the supporting arms at a position adjacent to the free end of the supporting arm such that an optimal force application angle is formed between the floss and the centerline of the gripping portion. Thanks to the optimal force application angle, the force applied to the gripping portion by a user gripping the gripping portion with two fingers (e.g., a thumb and the corresponding index finger) can be transmitted precisely and steadily to the two ends of the floss to stretch the floss tautly into a straight line segment between the free ends of the supporting arms, thereby allowing the floss to be pushed easily and precisely into an interdental gap to remove the food debris or dental plaque in the gap. The interdental-brush portion and the toothpick portion extend sequentially and linearly from the opposite second end of the gripping portion in a direction away from the gripping portion and are gradually reduced in width from the second end of the gripping portion in the direction away from the gripping portion until the free end of the toothpick portion is reduced to a point. The interdental elastic-bristle portion is integrally formed by injection molding a second plasticized material over the periphery of the interdental-brush portion and forms a plurality of bristles that extend vertically from the periphery of the interdental-brush portion and are gradually reduced in length toward the toothpick portion. The second plasticized material has a lower hardness than the first plasticized material in order for the first plasticized material to provide the gripping portion, the floss holding portion, the interdental-brush portion, and the toothpick portion with adequate structural strength, and for the second plasticized material to effectively protect the user's teeth, gums, and interdental papillae from being scratched, punctured, or abraded by the interdental-brush portion, which is a rigid structure formed of the first plasticized material. After each meal, a user can grip the gripping portion with two fingers (e.g., a thumb and the corresponding index finger) and, depending on personal needs, preferences, or habits, selectively place the floss holding portion, the interdental-brush portion (along with the toothpick portion), or only the toothpick portion into the oral cavity, in order to scrape off the plaque or food debris on and between teeth using the floss on the floss holding portion, to brush or scrape off the plaque or food debris on and between teeth using the interdental-brush portion and the interdental elastic-bristle portion thereon, or to scrape or pick off the plaque or food debris on and between teeth using the toothpick portion. The three-in-one tooth-cleaning device of the present invention can be carried around to perform diversified, thorough, and effective removing operations on the plaque or food debris on and/or between teeth according to personal needs, preferences, or habits whenever and wherever desired, thereby contributing greatly to the prevention of dental caries (especially interdental caries) and periodontal disease while ensuring that the foregoing tooth-cleaning operations will not damage the user's tooth surface, gums, or interdental papillae. Thus, oral diseases such as interdental caries, periodontal disease, and gingivitis (e.g., swollen or bleeding gums) can be effectively avoided to lower the risk of coronary artery diseases or other cardio- or cerebrovascular diseases (e.g., heart attack, thrombosis, various strokes, senile dementia, and amnesia) that may result from such oral diseases.

Another objective of the present invention is to provide a three-in-one tooth-cleaning device structured as a toothpick, an interdental brush, and a floss pick as described above, wherein the three-in-one tooth-cleaning device further includes an elastic toothpick-coating layer. The elastic toothpick-coating layer is integrally formed by injection molding the second plasticized material over the periphery of the toothpick portion so that the second plasticized material of the elastic toothpick-coating layer can effectively protect a user's tooth surface, gums, and interdental papillae from being scratched, punctured, or abraded by the toothpick portion, which is a rigid structure formed of the first plasticized material.

After each meal, a user can grip the gripping portion with two fingers (e.g., a thumb and the corresponding index finger) and place the toothpick portion into the oral cavity as needed, as preferred, or as is habitually done, in order to scrape or pick off the plaque or food debris on and between teeth using the toothpick portion and the elastic toothpick-coating layer thereon. This three-in-one tooth-cleaning device can also be used to perform diversified, thorough, and effective removing operations on the plaque or food debris on and/or between teeth according to personal needs, preferences, or habits whenever and wherever desired, and ensure that the foregoing tooth-cleaning operations will not damage the user's tooth surface, gums, or interdental papillae. Thus, oral health can be maintained, and related diseases, prevented.

BRIEF DESCRIPTION OF THE SEVERAL VIEWS OF THE DRAWINGS

The objectives and technical features of the present invention and the intended effects of the technical features can be better understood by referring to the following detailed description in conjunction with the accompanying drawings, in which.

DETAILED DESCRIPTION OF THE INVENTION

Figure 1:
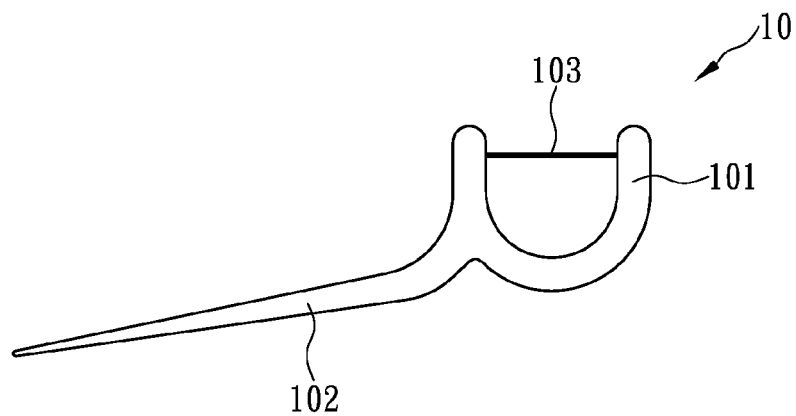
FIG. 1 schematically shows a conventional floss pick.
Figure 2:
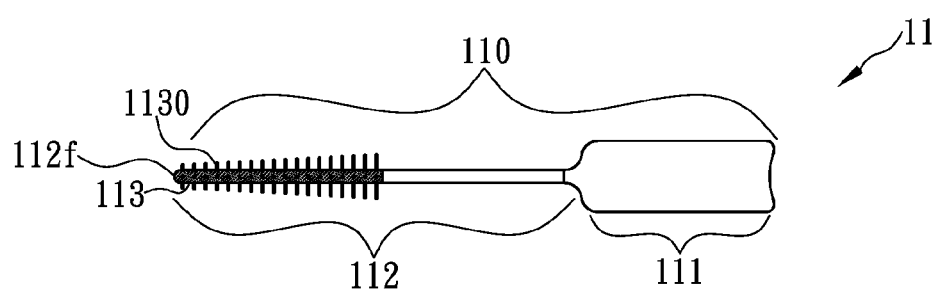
FIG. 2 schematically shows a conventional interdental brush.
Figure 3:
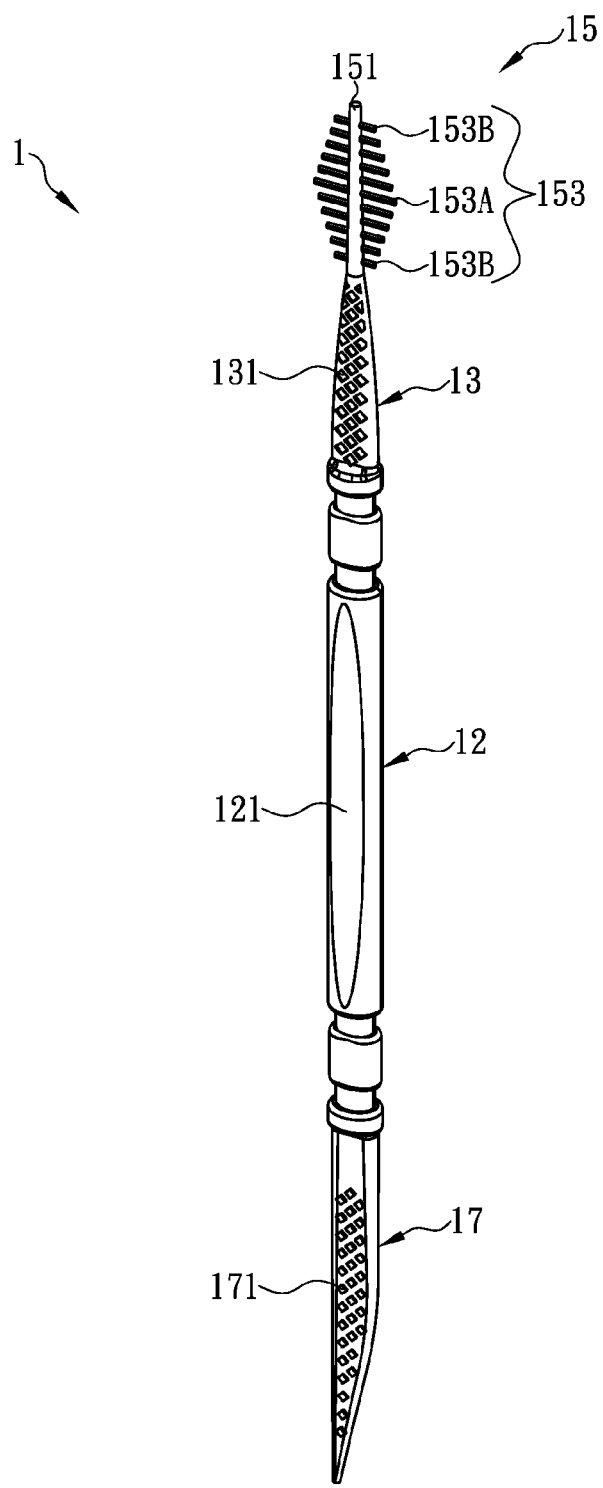
FIG. 3 is a perspective view of a conventional toothpick brush.
Figure 4:
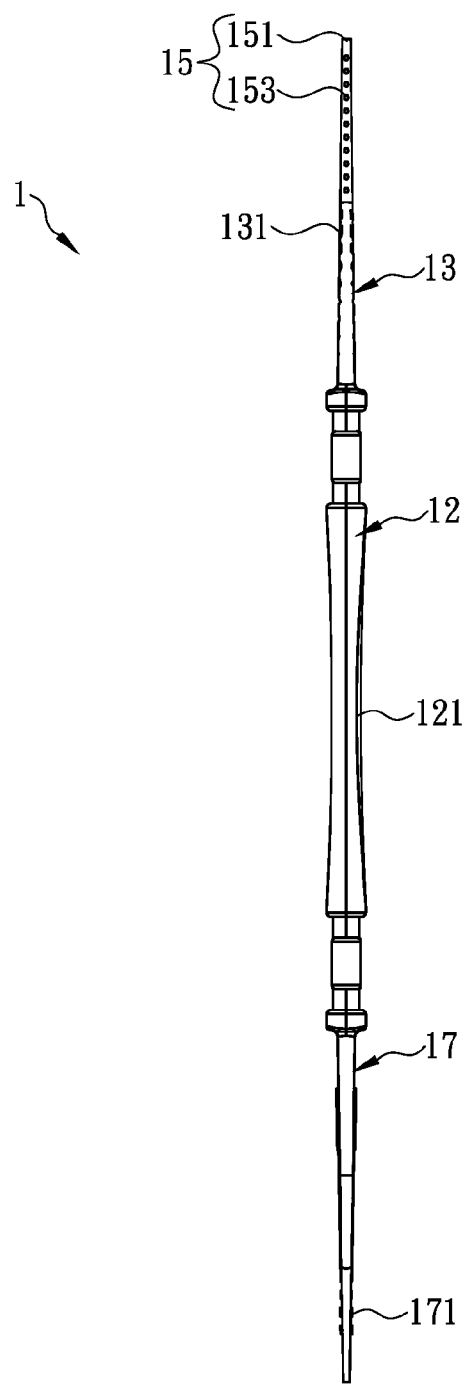
FIG. 4 is a side view of the conventional toothpick brush in FIG. 3.
Figure 5:
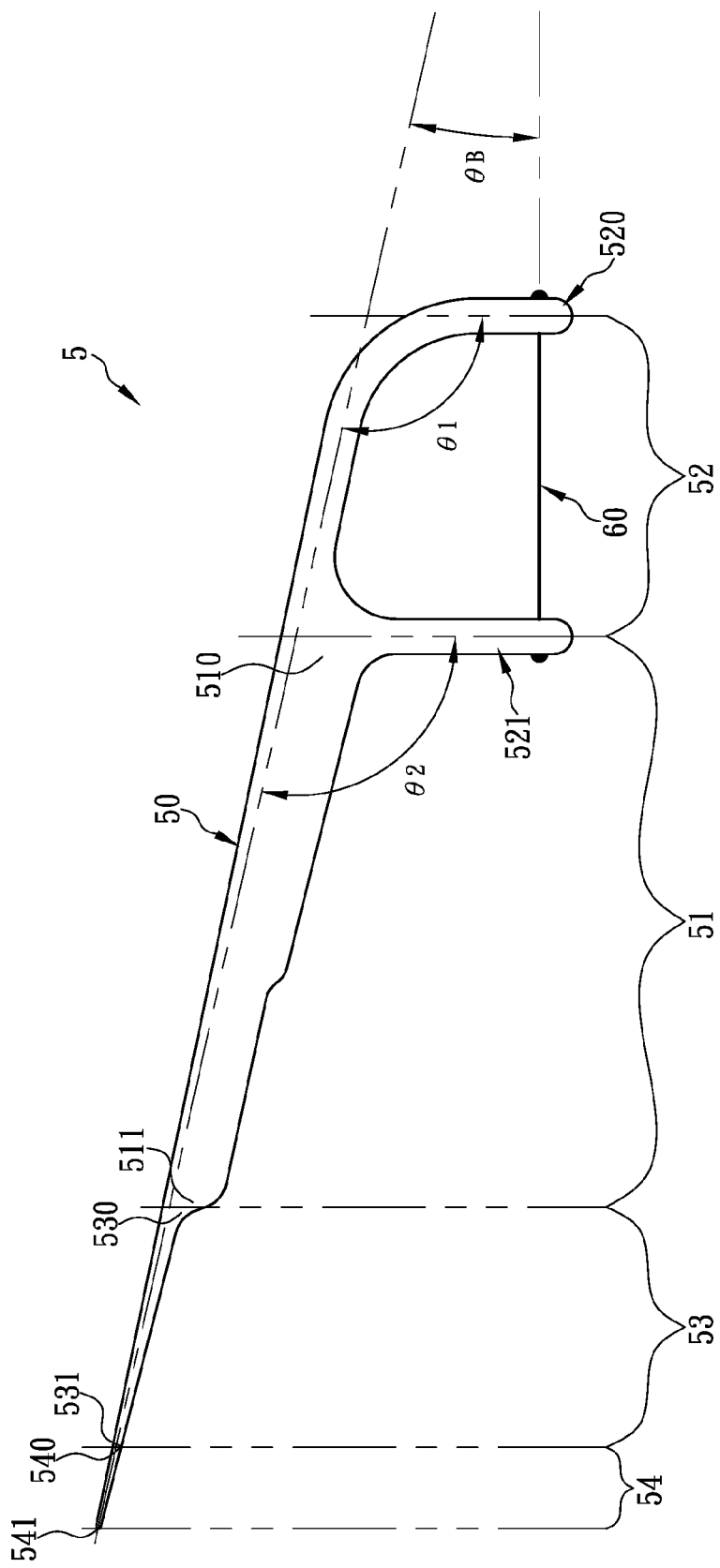
FIG. 5 schematically shows a preferred embodiment of the present invention.

Referring to FIG. 5, the present invention provides a three-in-one tooth-cleaning device 5 structured as a toothpick, an interdental brush, and a floss pick. According to the preferred embodiment shown in FIG. 5, the three-in-one tooth-cleaning device 5 includes a main body 50 and an interdental elastic-bristle portion 70 (not shown in FIG. 5). The main body 50 is integrally formed of a first plasticized material by injection molding and includes a gripping portion 51, a floss holding portion 52, an interdental-brush portion 53, and a toothpick portion 54. The gripping portion 51 has a flat (or cylindrical or otherwise in terms of cross-sectional shape) and straight-line configuration so that a user can grip the gripping portion 51 by two opposite lateral sides thereof with two fingers (e.g., a thumb and the corresponding index finger). The floss holding portion 52 is U-shaped, is fixedly connected to one end of the gripping portion 51, and has two corresponding supporting arms 520 and 521. The centerline of the supporting arm 520 forms a first angle $\theta_1$ with the centerline of the gripping portion 51, and the centerline of the supporting arm 521 forms a second angle $\theta_2$ with the centerline of the gripping portion 51. A length of dental floss 60 is fixed at two ends to the supporting arms 520 and 521 at positions respectively adjacent to the free ends of the supporting arms such that the floss 60 forms an optimal force application angle $\theta_B$ with the centerline of the gripping portion 51. When a user grips the gripping portion 51 with two fingers (e.g., a thumb and the corresponding index finger) and applies a force to the gripping portion 51, the force applied can be transmitted precisely and steadily to the two ends of the floss 60 thanks to the optimal force application angle $\theta_B$, and in consequence the floss 60 is tautly stretched into a straight line segment between the supporting arms 520 and 521 and can be pushed into an interdental gap with ease and precision to remove the food debris or dental plaque in the gap. As shown in FIG. 5, the interdental-brush portion 53 and the toothpick portion 54 extend linearly and sequentially from the other end (hereinafter referred to as the second end, indicated by the reference numeral 511) of the gripping portion 51 in a direction away from the gripping portion 51. Moreover, the interdental-brush portion 53 and the toothpick portion 54 are gradually reduced in width from the second end of the gripping portion 51 in the direction away from the gripping portion 51 until the free end 541 of the toothpick portion 54 is reduced to a point. With continued reference to FIG. 5, the interdental-brush portion 53 has one end 530 linearly and fixedly connected to the second end 511 of the gripping portion 51, and the toothpick portion 54 has one end 540 linearly and fixedly connected to the other end 531 of the interdental-brush portion 53.

Figure 6:
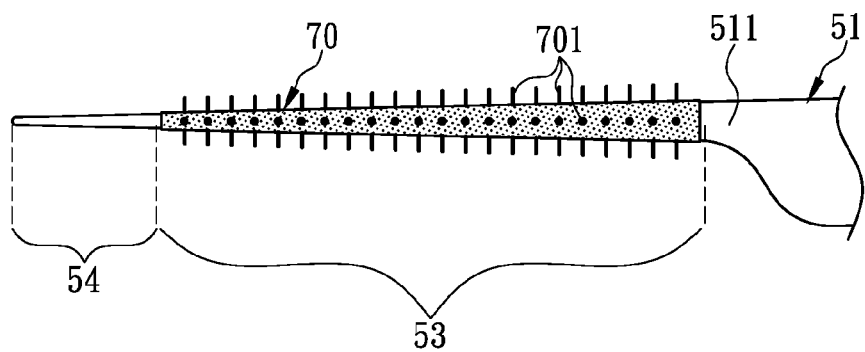
FIG. 6 is a partial view of the preferred embodiment in FIG. 5.

In this preferred embodiment of the invention, referring to FIG. 6, the interdental elastic-bristle portion 70 is integrally formed by injection molding a second plasticized material over the periphery of the interdental-brush portion 53 and forms a plurality of bristles 701 extending vertically from the periphery of the interdental-brush portion 53. The bristles 701 are gradually reduced in length toward the toothpick portion 54. The first plasticized material is tough and has a higher hardness than the second plasticized material in order to lend sufficient structural strength to the gripping portion 51, the floss holding portion 52, the interdental-brush portion 53, and the toothpick portion 54. Meanwhile, the relatively soft second plasticized material can effectively protect a user's teeth, gums, and interdental papillae from being scratched, punctured, or abraded by the floss holding portion 52, the interdental-brush portion 53, and the toothpick portion 54, all of which are rigid structures formed of the first plasticized material.

In this preferred embodiment of the invention, referring back to FIG. 5 and FIG. 6, the first plasticized material is a tough plasticized material such as acrylonitrile butadiene styrene (ABS), polypropylene (PP), or high-impact polystyrene (HIPS); and the second plasticized material is a plasticized material featuring softness and elasticity, such as a thermoplastic elastomer (TPE) or medical-grade synthetic rubber. To ensure that the specifications and dimensions of the toothpick, interdental-brush, and floss-pick structures of the three-in-one tooth-cleaning device 5 are suitable for most people's oral cavities and interdental gaps, referring again to FIG. 5 and FIG. 6, it is preferable that the length of the interdental-brush portion 53 ranges from 11 mm to 21 mm; that the length of the toothpick portion 54 ranges from 2 mm to 4 mm; that the combined length of the gripping portion 51, the floss holding portion 52, the interdental-brush portion 53, and the toothpick portion 54 ranges from 73 mm to 87 mm; and that the first angle $\theta_1$ is larger than the second angle $\theta_2$ so that the optimal force application angle $\theta_B$ remains optimal in terms of the ease with which a user can grip, and apply a force to, the gripping portion 51 with two fingers (e.g., a thumb and the corresponding index finger), allowing the force applied by the user to be transmitted precisely and steadily to the two ends of the floss 60 and thereby stretch the floss 60 tautly into a straight line segment between the supporting arms 520 and 521 so that the floss 60 can be pushed easily and precisely into an interdental gap to remove the food debris or plaque in the gap.

After each meal, a user can grip the gripping portion 51 of the three-in-one tooth-cleaning device 5 with two fingers (e.g., a thumb and the corresponding index finger) and, depending on personal needs, preferences, or habits, put either the floss holding portion 52 or the interdental-brush portion 53 and the toothpick portion 54 into the oral cavity, in order to scrape off the plaque or food debris on and between teeth using the floss 60 on the floss holding portion 52, to brush or scrape off the plaque or food debris on and between teeth using the interdental-brush portion 53 and the interdental elastic-bristle portion 70 thereon, or to scrape or pick off the plaque or food debris on and between teeth using the toothpick portion 54.

A user, therefore, only has to carry the three-in-one tooth-cleaning device 5 with them, and the three-in-one tooth-cleaning device 5 can be used to perform diversified, thorough, and effective removing operations on the plaque or food debris on and/or between teeth according to personal tooth-cleaning needs, preferences, or habits whenever and wherever desired. This not only contributes greatly to the prevention of dental caries (especially interdental caries) and periodontal disease, but also ensures that persistent performance of the foregoing tooth-cleaning operations will not damage the user's tooth surface, gums, or interdental papillae. Consequently, oral diseases such as interdental caries, periodontal disease, and gingivitis (e.g., swollen or bleeding gums) can be effectively avoided to lower the risk of coronary artery diseases or other cardio- or cerebrovascular diseases (e.g., heart attack, thrombosis, various strokes, senile dementia, and amnesia) attributable to such oral diseases, and the user's health is safeguarded through disease prevention.

Figure 7:
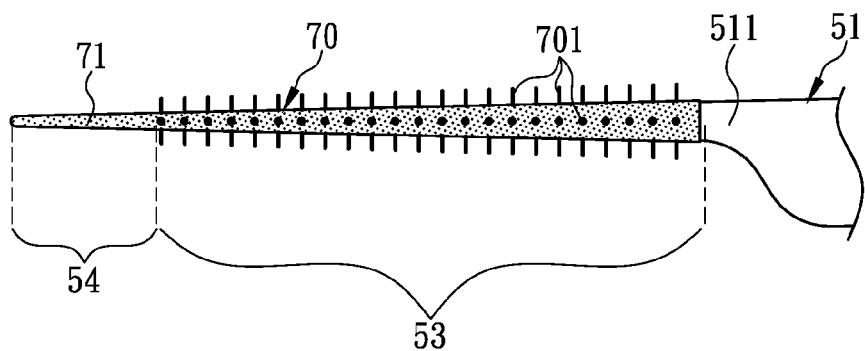
FIG. 7 is a partial view of another preferred embodiment of the invention.

In other preferred embodiments of the present invention, referring to FIG. 7, the three-in-one tooth-cleaning device 5 further includes an elastic toothpick-coating layer 71 so that, once inserted into an interdental gap, the interdental-brush portion 53 and the toothpick portion 54 of the three-in-one tooth-cleaning device 5 will not damage the gum portion or interdental papilla adjacent to or corresponding to the gap. The elastic toothpick-coating layer 71 is integrally formed by injection molding the second plasticized material over the periphery of the toothpick portion 54. The relatively soft second plasticized material of the elastic toothpick-coating layer 71 can effectively protect a user's teeth, gums, and interdental papillae from being scratched, punctured, or abraded by the toothpick portion 54, which is a rigid structure formed of the first plasticized material. To render the elastic toothpick-coating layer 71 capable of, and the toothpick portion 54 more effective in, scraping or picking off the plaque or food debris on and/or between teeth, the elastic toothpick-coating layer 71 can be formed with a plurality of recesses, projecting blocks, bristles, or wavy lines (not shown) on or in its surface to increase friction on the surface according to practical needs.

Thus, with continued reference to FIG. 7, a user after each meal can grip the gripping portion 51 of the three-in-one tooth-cleaning device 5 with two fingers (e.g., a thumb and the corresponding index finger) and put the interdental-brush portion 53 and the toothpick portion 54 into the oral cavity as needed, as preferred, or as is habitually done, in order to brush or scrape off the plaque or food debris on and between teeth using the interdental-brush portion 53 and the interdental elastic-bristle portion 70 and bristles 701 thereon, or to scrape or pick off the plaque or food debris on and between teeth using the toothpick portion 54 and the elastic toothpick-coating layer 71 thereon.

Figure 8:
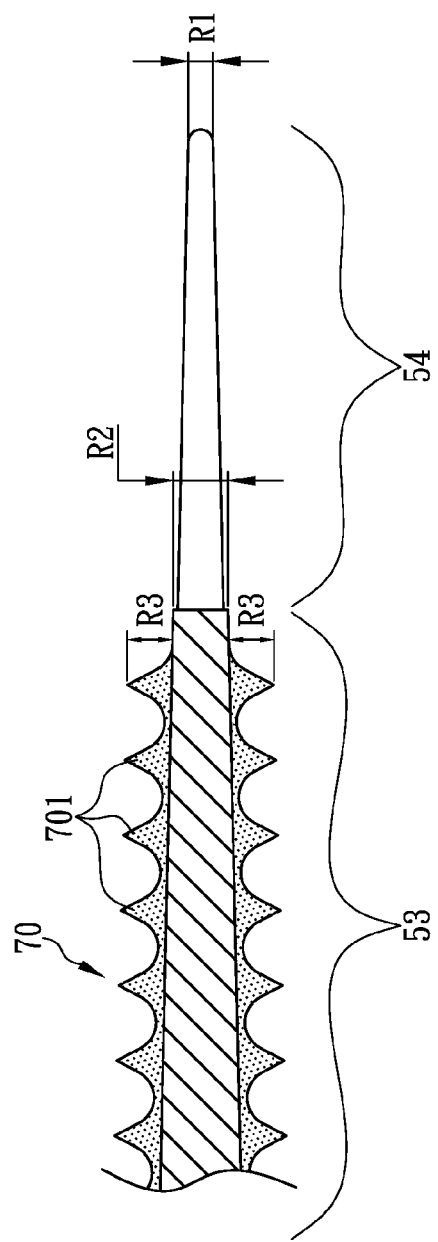
FIG. 8 is a partial sectional view of the preferred embodiment in FIG. 5.

Preferably, referring back to FIG. 5, FIG. 6, and FIG. 7, the interdental elastic-bristle portion 70 and the elastic toothpick-coating layer 71 are integrally formed by injection molding the second plasticized material sequentially over the periphery of the interdental-brush portion 53 and the periphery of the toothpick portion 54. Moreover, referring also to FIG. 8, the interdental-brush portion 53 and the toothpick portion 54 extend sequentially and linearly from the second end 511 of the gripping portion 51 in a direction away from the gripping portion 51 and are gradually reduced in width from the second end 511 of the gripping portion 51 in the direction away from the gripping portion 51 until the free end 541 of the toothpick portion 54 is reduced to a point $R_1$, whose largest diameter is preferably not greater than 3 mm. The bristles 701 are gradually reduced in length toward the toothpick portion 54 and have lengths $R_3$ preferably ranging from 1 mm to 6 mm. Thus, a user who has put the interdental-brush portion 53 and the toothpick portion 54 into the oral cavity only has to bring the point $R_1$ at the free end 541 of the toothpick portion 54 into alignment with an interdental gap and push the gripping portion 51 gently toward the gap, and the toothpick portion 54 together with the elastic toothpick-coating layer 71 thereon can be easily inserted into the gap to scrape or pick off the plaque or food debris on and between the teeth adjacent to the gap. By moving the gripping portion 51 back and forth, the user can also pass the interdental-brush portion 53 and the interdental elastic-bristle portion 70 thereon through the gap in a reciprocating manner to brush or scrape off the plaque or food debris on and between the teeth, and during the process, the relatively soft material of the interdental elastic-bristle portion 70 and of the bristles 701 will protect the user's tooth surface, gum, and interdental papilla from being scratched, punctured, or abraded by the interdental-brush portion 53 and the toothpick portion 54, both of which are rigid structures formed of the first plasticized material. Furthermore, while the bristles 701 are inserted through, and moved back and forth in, the gap, not only can the food debris or plaque in the gap be effectively brushed off and taken completely out of the gap, but also the gum portion and interdental papilla corresponding to the gap are massaged by the soft, elastic, and length-varied bristles 701 in a reciprocating manner to promote blood circulation in the gum portion and the interdental papilla, thereby achieving the objective of maintaining oral health, particularly the health of teeth and gums.

The embodiments described above are only some preferred ones of the present invention. Implementation of the invention is by no means limited to the embodiments disclosed herein. The three-in-one tooth-cleaning device 5 may vary in configuration, provided that the main body 50 is composed of the gripping portion 51, the floss holding portion 52, the interdental-brush portion 53, and the toothpick portion 54; and that every part of the aforesaid rigid structures that may contact a user's teeth, gums, or interdental papillae is coated with a soft material to protect the user's teeth, gums, and interdental papillae from being scratched, punctured, or abraded by the interdental-brush portion 53 and/or the toothpick portion 54 (both of which are rigid structures formed of the first plasticized material) when either the interdental-brush portion 53 and the interdental elastic-bristle portion 70 thereon are used to brush or scrape off the plaque or food debris on and between teeth, or the toothpick portion 54 and the elastic toothpick-coating layer 71 thereon are used to scrape or pick off the plaque or food debris on and between teeth. All changes and modifications based on the foregoing design principle and readily conceivable by a person skilled in the art should fall within the scope of the invention.

While the invention herein disclosed has been described by means of specific embodiments, numerous modifications and variations could be made thereto by those skilled in the art without departing from the scope of the invention set forth in the claims.

What is claimed is:

1. A three-in-one tooth-cleaning device structured as a toothpick, an interdental brush, and a floss pick, comprising:
a main body integrally formed of a first plasticized material by injection molding, wherein the main body comprises a gripping portion, a floss holding portion, an interdental-brush portion, and a toothpick portion; the gripping portion has a straight-line configuration with a centerline and is designed to be gripped with two fingers; the floss holding portion is U-shaped, is fixedly connected to an end of the gripping portion, and has two corresponding supporting arms each having a centerline; the centerlines of the supporting arms form a first angle and a second angle with the centerline of the gripping portion respectively; a length of dental floss has two ends each fixed to one of the supporting arms at a position adjacent to a free end of the one of the supporting arms such that the dental floss and the centerline of the gripping portion form a force application angle, allowing a force applied to the gripping portion by a user gripping the gripping portion with two fingers to be transmitted precisely and steadily to the two ends of the dental floss, thereby stretching the dental floss tautly into a straight line segment between the free ends of the supporting arms so that the dental floss is easily and precisely pushable into an interdental gap to remove food debris or dental plaque in the interdental gap; and the interdental-brush portion and the toothpick portion extend sequentially and linearly from an opposite second end of the gripping portion in a direction away from the gripping portion and are gradually reduced in width from the second end of the gripping portion in the direction away from the gripping portion until a free end of the toothpick portion is reduced to a point; and
an interdental elastic-bristle portion integrally formed by injection molding a second plasticized material over a periphery of the interdental-brush portion, wherein the interdental elastic-bristle portion forms a plurality of bristles extending vertically from the periphery of the interdental-brush portion; the bristles are gradually reduced in length along a direction from a first end of the interdental elastic-bristle portion proximate to the gripping portion toward a second end of the interdental elastic-bristle portion proximate to the toothpick portion; and the first plasticized material is harder than the second plasticized material in order to provide the gripping portion, the floss holding portion, the interdental-brush portion, and the toothpick portion with adequate structural strength while the relatively soft second plasticized material effectively protects the user's teeth, gums, and interdental papillae from being scratched, punctured, or abraded by the interdental-brush portion, which is a rigid structure formed of the first plasticized material, wherein no bristle extending along a direction vertically away from a periphery of the toothpick portion is formed or covered on the periphery of the toothpick portion.

2. The three-in-one tooth-cleaning device of claim 1, further comprising an elastic toothpick-coating layer, wherein the elastic toothpick-coating layer is integrally formed by injection molding the second plasticized material over the periphery of the toothpick portion in order for the relatively soft second plasticized material of the elastic toothpick-coating layer to effectively protect the user's tooth surface, gums, and interdental papillae from being scratched, punctured, or abraded by the toothpick portion, which is a rigid structure formed of the first plasticized material.

3. The three-in-one tooth-cleaning device of claim 2, wherein the second plasticized material is a soft and elastic plasticized material selected from the group consisting of a thermoplastic elastomer (TPE) and medical-grade synthetic rubber.

4. The three-in-one tooth-cleaning device of claim 3, wherein the interdental-brush portion has a length ranging from 11 mm to 21 mm.

5. The three-in-one tooth-cleaning device of claim 4, wherein the toothpick portion has a length ranging from 2 mm to 4 mm.

6. The three-in-one tooth-cleaning device of claim 5, wherein the gripping portion, the floss holding portion, the interdental-brush portion, and the toothpick portion have a combined length ranging from 73 mm to 87 mm.

7. The three-in-one tooth-cleaning device of claim 6, wherein the first angle is larger than the second angle.

8. The three-in-one tooth-cleaning device of claim 7, wherein the bristles have lengths ranging from 1 mm to 6 mm.

9. The three-in-one tooth-cleaning device of claim 8, wherein the elastic toothpick-coating layer has a surface formed with a plurality of recesses, projecting blocks, or wavy lines to increase friction on the surface.

10. The three-in-one tooth-cleaning device of claim 1, wherein the first plasticized material is a plasticized material selected from the group consisting of acrylonitrile butadiene styrene (ABS), polypropylene (PP), and high-impact polystyrene (HIPS).

11. The three-in-one tooth-cleaning device of claim 10, wherein the second plasticized material is a soft and elastic plasticized material selected from the group consisting of a thermoplastic elastomer (TPE) and medical-grade synthetic rubber.

12. The three-in-one tooth-cleaning device of claim 11, wherein the interdental-brush portion has a length ranging from 11 mm to 21 mm.

13. The three-in-one tooth-cleaning device of claim 12, wherein the toothpick portion has a length ranging from 2 mm to 4 mm.

14. The three-in-one tooth-cleaning device of claim 13, wherein the gripping portion, the floss holding portion, the interdental-brush portion, and the toothpick portion have a combined length ranging from 73 mm to 87 mm.

15. The three-in-one tooth-cleaning device of claim 14, wherein the first angle is larger than the second angle.

16. The three-in-one tooth-cleaning device of claim 15, wherein the bristles have lengths ranging from 1 mm to 6 mm.

17. The three-in-one tooth-cleaning device of claim 16, wherein the elastic toothpick-coating layer has a surface formed with a plurality of recesses, projecting blocks, or wavy lines to increase friction on the surface.

* * * * *